Dec. 23, 1969 H. J. GUGGENHEIM ET AL 3,485,551
RUBIDIUM IRON FLUORIDE MAGNETO-OPTICAL DEVICES
Filed July 17, 1967 2 Sheets-Sheet 1
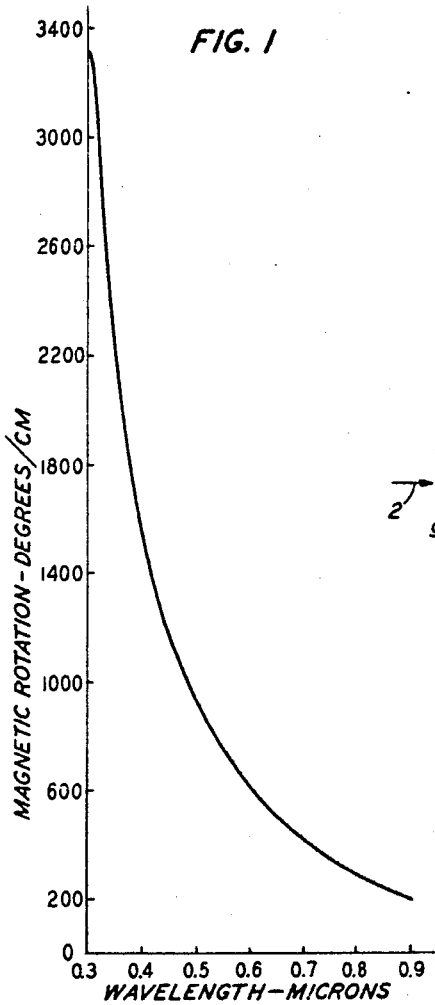
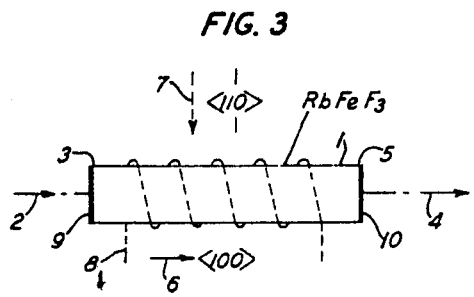
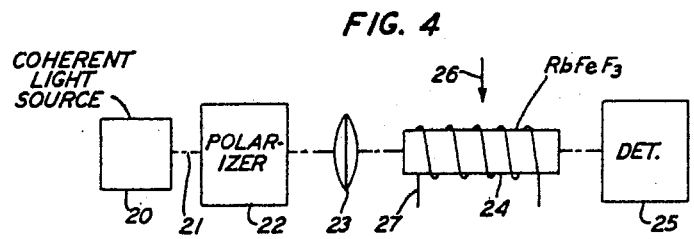
INVENTORS H. J. GUGGENHEIM
S. SINGH
BY
*George S. Indig*
ATTORNEY United States Patent Office 3,485,551
Patented Dec. 23, 1969

3,485,551
RUBIDIUM IRON FLUORIDE MAGNETO-OPTICAL
DEVICES
Howard J. Guggenheim, Somerville, and Shobha Singh,
Summit, N.J., assignors to Bell Telephone Laboratories,
Incorporated, Murray Hill, N.J., a corporation of New
York
Filed July 17, 1967, Ser. No. 653,834
Int. Cl. G02f 1/22, 1/28, 1/26
U.S. Cl. 350—151                           7 Claims

ABSTRACT OF THE DISCLOSURE

Rubidium iron fluoride ($RbFeF_3$) evidences a substantial magneto-optic effect over the entire electromagnetic wave spectrum including the visible and part of the ultraviolet. Modulators and isolators, either continuous or pulse, may be operated over this entire spectrum at liquid nitrogen temperature.

BACKGROUND OF THE INVENTION

Field of the invention

The invention is concerned with elements for use in the isolation and modulation of electromagnetic wave energy; the frequencies including that of the visible spectrum and extending into the ultraviolet. Ultimate use for such elements is, inter alia, in communication systems, switching systems, and memory arrays, and for these purposes such energy is ordinarily coherent. Elements of the type with which this invention is concerned operate on the magneto-optic principle. They generally depend for their operation upon the magnetic rotation which is imposed upon polarized wave energy resulting from impression of a magnetic field ordinarily having a component in the wave propagation direction.

Description of the prior art

Magneto-optic materials have previously been proposed for the device uses with which this invention is concerned. Probably the first practical material so applied was yttrium iron garnet (YIG), and for several reasons this material and compositional modifications remain the most promising candidates.

In recent work reported in 7 Applied Physics Letters 27 July 1965, it was demonstrated that gallium-doped YIG could be operated as an amplitude modulator with a bandwidth of the order of a gigahertz using a helium-neon laser oscillator operating at 1.15 microns. YIG evidences sufficient transparency over the wavelength range of about one micron to about five microns, and expedient operation with laser oscillators operating over this range is so assured.

Unfortunately, the high frequency absorption edge for YIG is below the red end of the visible spectrum, and, accordingly, YIG is not a useful modulator material in the visible light spectrum. A recognized need exists for modulator materials which will operate in such a frequency range. Coherent light sources operating at such frequencies include helium-neon operating at 6328 A. units, the second harmonic of YAG-neodymium at 5324 A. units, and argon at 4880 A. units.

The need has been sufficient that each newly discovered magnetic material with any measurable transparency in the visible has been examined with a view to the possibility of construction of a modulator. Materials which have been examined with this in view include europium oxide (EuO) and chromium tribromide ($CrBr_3$). However, no commercially practical materials have emerged.

For some purposes, the desire to magneto-optically modulate in the visible has been satisfied by the use of glasses with high parametric material loadings. Such improvisation has made use of terbium and other rare earth loading. See Faraday Rotation of Rare-Earth (III) Phosphate Glasses by S. B. Berger, C. R. Kurkjian, C. B. Rubinstein, and A. W. Treptow, in Physical Review, volume 133, pages A723 to A727, February 1964. While this approach has operated successfully, specific rotation values are rather low, and, in general, the desire for effective magneto-optic modulation has not been satisfied.

Generally, the desire for magneto-optic modulation or isolation in the visible is frustrated by the lack of domain magnetic materials evidencing transparency at the desired frequency. In general, the very rare exceptions have not been practically available or have manifested physical or chemical properties making them otherwise undesirable. Recently, a new domain magnetic material, rubidium iron fluoride, $RbFeF_3$ was announced. (37 Journal of Applied Physics 975, March 1966.) While it was indicated that this new material was at the same time domain magnetic and transparent to frequencies within the visible spectrum, it was indicated that rotation had not been observed in the visible with the material in the magnetic state.

BRIEF DESCRIPTION OF THE DRAWING

FIG. 1 on coordinates of magnetic rotation in degrees per centimeter on the ordinate and wavelength in microns on the abscissa is a plot showing the relationship between these two parameters for the composition of the invention;

FIG. 3 is a front elevational view of the device using a crystal of rubidium iron fluoride; and FIG. 4 is a schematic representation of a modulator again dependent for its operation upon a crystal of $RbFeF_3$.

DETAILED DESCRIPTION.—THE DRAWING

Figure 2:
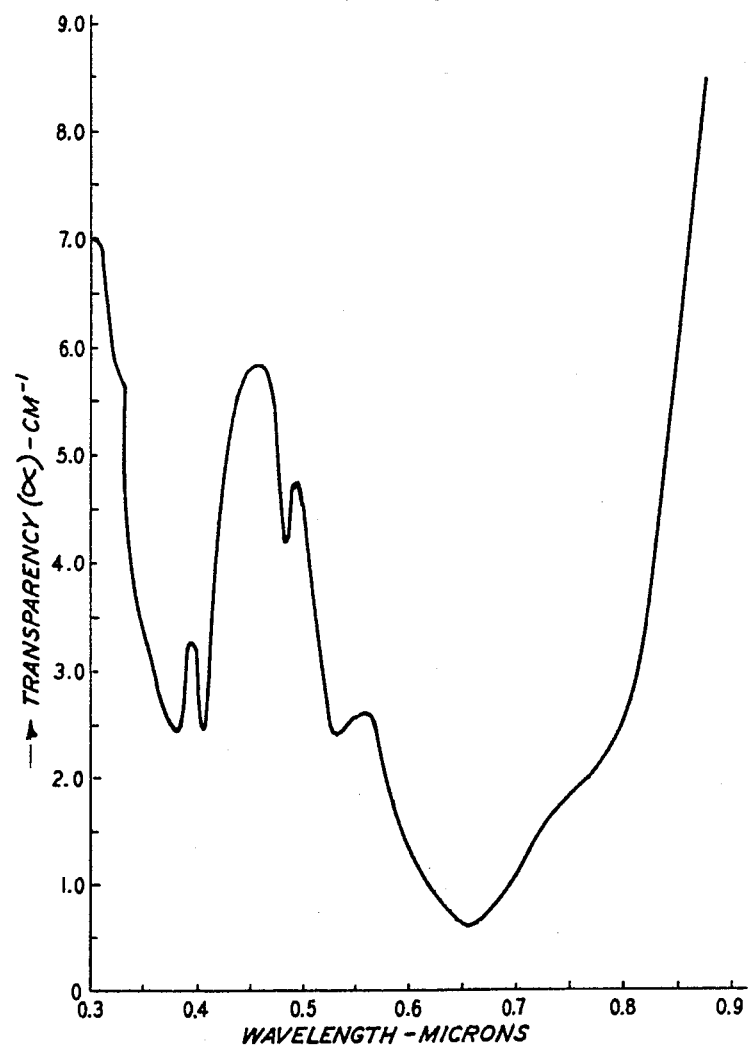
FIG. 2 on coordinates of absorption in reciprocal centimeters on the ordinate and wavelength in microns on the abscissa is a plot showing the relationship between transparency and frequency for the composition of the invention.

Referring to FIGS. 1 and 2, it is seen that $RbFeF_3$ manifests substantial rotation and transparency over the entire visible spectrum out into the ultraviolet. From FIG. 1, it is seen that a rotation in excess of 400° per centimeter at .7 micron or 7000 A. is the minimum value for the spectrum. A maximum value well in excess of 3000° per centimeter is measured at 3000 A. units in the ultraviolet. The measurements which were plotted in FIG. 1 were made in the usual manner with a single crystal section of $RbFeF_3$ magnetically saturated in an easy direction parallel to the light propagation direction. The light beam was coherent and plane polarized. Rotation was measured by use of an analyzer consisting of a plane polarizing medium and an amplitude detector. Light sources used included a Xenon high pressure lamp in conjunction with a monochromator and a He-Ne laser operating at 6328 A. units.

The fact that rotation increases with frequency as seen from FIG. 1 is not unusual (many previously measured magnetic materials such as iron shown such increase as the UV is approached) and, further, is well founded theoretically. It is interesting to note that the curve form is smooth and shows no marked perturbations as have been observed in many other materials. Of course while increasing characteristic rotation with frequency has been often observed, even the maximum value so obtained is not necessarily of sufficient magnitude to be usable in a real operating device.

One of the more significant features of $RbFeF_3$ is its transparency. In FIG. 2 this characteristics is plotted in terms of α measured in reciprocal centimeters and wavelength in microns. $\alpha$ is defined in accordance with the relationship $$I = I_0(e^{-\alpha x})$$

where $I_0$ equals incident intensity,
$I$ equals transmitted intensity,
$x$ equals length of transmission path through medium, and
$e$ is the natural logarithm base.

If $x$ is measured in centimeters, $\alpha$ is in units of reciprocal centimeters or cm.$^{-1}$. If, for example, the transparency is 1 cm.$^{-1}$ as it is for a wavelength $\lambda$ of about .62 micron (.62$\mu$), then the intensity of the beam is reduced to $1/e$th of its incident or $I_0$ value. For transaprency of 2 cm.$^{-1}$, the intensity level is reduced to $1/e$th of its initial value in a transmission path length of ½ cm.

From FIG. 2 it is seen that the transparency over the visible spectrum is never poorer than 6 or 7 cm.$^{-1}$. Since many modulators and isolators are designed to produce a maximum rotation of 45°, it is possible to calculate a figure of merit or a real loss value from the data of FIGS. 1 and 2. As an example, for helium-neon laser operating with .6328 A. transition, the rotation is about 520° per centimeter and the transparency is about 0.75 cm.$^{-1}$. The length of the unit required for 45° rotation is therefore about .09 centimeter, and the loss for this length crystal is about 6%. Similar considerations indicate lengths of 0.046 cm., 0.055 cm., 0.1 cm. and 0.014 cm., losses of 18%, 12%, 10% and 10% for wavelengths of 4880 A., 5324 A., 6943 A. and 3000 A. respectively.

In FIG. 3 the element shown consists of crystalline body 1 of RbFeF$_3$. Provision is made for introduction of a plane polarized beam 2 of electromagnetic energy of a wavelength of up to 7000 A. units. At surface 3 and for extraction of a beam 4 at surface 5, the orientation of the crystal is ordinarily such that transmission is along a <100> direction. The reasons for this selection will be discussed in detail under "General Properties of RbFeF$_3$." Application of a magnetic field of such magnitude as to magnetically saturate body 1 and in such direction as to produce a magnetization component in the beam transmission direction <100> results in rotation of the beam within the medium of body 1. Such magnetization component is schematically indicated by arrow 6. Where component 6 is static, the device of FIG. 3 may be considered as an isolator. Proper selection of crystal length and/or magnetization direction such as to result in an appropriate component 6 may produce a rotation of 45°. Since magnetic rotation is nonreciprocal, any returning energy as may be produced by reflection from surface 5 is thrown out of phase with the incoming beam 2. In the usual isolator, field is applied parallel to the beam in which event crystal length may be directly selected on the basis presented in FIG. 1 as discussed above. The isolator function is otherwise conventional.

The device of FIG. 3 may also be operated as a modulator. In such operation the magnitude of parallel magnetic component 6 is altered in accordance with a modulating signal. Such operation may be achieved by application of a field schematically depicted as arrow 7 which may be orthogonal to the beam direction and which is of sufficient magnitude to magnetically saturate body 1 in the direction in which it is applied. A modulating current may be passed through an encircling winding 8. The modulating field so produced has the effect of tilting the magnetization so as to result in a component 6 of varying magnitude. For reasons which will be discussed, a desired operating mode includes application of the orthogonal field 7 in a <110> crystallographic direction.

Operation of the device of FIG. 3 as a modulator is further described. Body 1 is magnetically saturated in this illustrative case by a normal magnetic field 7. The field applied may advantageously exceed the value required to saturate in order to increase the frequency of ferromagnetic resonance and thereby to increase the frequency limitations of the device as is well known. In this mode of operation, a plane polarized light beam 2 propagated normal to the magnetization produced by field 7 desirably polarized parallel to or perpendicular to field 7 to avoid magnetically induced birefringence effects introduced at surface 3 passes through body 1 unchanged. Introduction of current through winding 8 tilts the magnetization so resulting in a component 6 in the light transmission direction. The magnitude of this component determines the degree of rotation or of phase change or of frequency change depending upon the system. Regardless of the mode of operation, the degree of modulation may be enhanced by use of optionally partially reflecting surfaces 9 and 10. The resulting cavitation permits retention of the light beam for a given statistical number of passes during each of which the modulation is increased. Since the power required to increase modulation in a given crystal length for a single pass varies as the square of the degree of modulation, the advantage from this standpoint is significant.

It has been indicated that the modulator may be operated in such manner as to result in phase change or in frequency change. Such alternate modes are well known. In a magnetic device dependent upon magnetic rotation, such alternate modes require the use of circularly polarized electromagnetic wave energy. For such a beam, variation in the length of magnetization component 6 effectively alters the path length. It is also possible to operate such a modulator depending on the magnetically induced birefringence rather than the gyromagnetic activity introduced by the field. Such operation is similar to that of an electro-optic modulator. For such operation, modulation, whether phase, amplitude or frequency may be achieved by use of plane polarized energy, however using a polarization plane which is neither parallel to nor normal to the magnetization.

FIG. 4 is merely illustrative of otherwise well known systems useful for communications and other purposes. The apparatus of this figure consists of laser oscillator 20 producing light beam 21 which passes through plane polarizer 22, focusing means 23, RbFeF$_3$ modulator 24 and detector 25 in succession. An applied field 26 having a component normal to the light transmission direction which direction defines a <110> crystallographic axis in common with the preferred mode of operation of all modulators of this invention desirably maintains body 24 magnetically saturated. Modulating current introduced through winding 27 results in rotation of the plane polarized light beam to a degree dependent upon the magnitude of the component of magnetization lying in the transmission direction. In common with other modulation apparatus, the relative polarization directions of elements 22 and 25 depend upon the desired mode of operation. They may be crossed so as to block transmission in the absence of a modulating current, or they may be parallel to permit maximum transmission in the absence of modulating current. They may be at some intermediate angle for biased linear CW (continuous wave) operation, or, for one illustrative mode of digital operation which, while resulting in some loss may take advantage of a rotation of less than 90°.

Alternate modes of operation are known. They include, for example, application of a D-C field at some angle other than orthogonal to the beam direction. They include also the use of a completely reflecting and surface at the termination of the beam transversal path so as to result in a double pass device. Such mode of operation, of course, requires some means for separating the incoming and outcoming energy. Such means may include a Wollaston prism, and, depending upon crystal length and other operating conditions, may also include a static rotator. Such alternate arrangements are not considered a necessary part of this description and are therefore not depicted.

Description of FIGS. 3 and 4 has been in terms of continued field application and also of magnetic saturation. The very small scattering effect of domain walls in this material permits operation at field values as low as one-third that required to saturate. This, plus the coercivity of $RbFeF_3$ permits isolator operation dependent on the remanent magnetization and without continued applied field.

GROWTH $RbFeF_3$ may be grown by several techniques. Since the material is congruently melting (about 845° C.) and has a reasonably low vapor pressure at its melting point (probably less than $\frac{1}{10}$ mm.), the preferred techniques involve growth from a melt of stoichiometric composition. Crystals on which some of the measurements set forth were grown by a zone refining technique and/or by modified Bridgman technique. While these procedures are merely illustrative, they are expedient, and for this reason they are generally described.

ZONE MELTING TECHNIQUE

In accordance with this procedure, powdered rubidium fluoride was placed in an 8″ boat constructed of graphite or platinum, and this material was zone refined in an inert atmosphere by passage at from 1 to 10 cm. per hour through a single heater with one pass. Since most significant impurities have a distribution coefficient numerically less than one, they were so concentrated in the final portion to freeze. The rod was cropped to remove this contaminated (and discolored) section.

The refining procedure is but one technique for removing normally present impurities such as water and products of hydrolysis such as rubidium oxide, rubidium hydroxide and rubidium oxyfluoride. Such products, if permitted to remain, result in inhomogeneities, and, consequently light scattering, in the final crystal. Alternate techniques include removal of moisture at room temperature in a vacuum.

All procedures in which the rubidium fluoride or the final composition is heated to temperatures of 100° C. or above require exclusion of moisture and oxygen. Most of the described work has been carried out in an inert atmosphere of nitrogen or helium.

At the termination of the zone refining step, the rubidium fluoride appears as a water white crystalline mass which may or may not be single crystal.

Iron fluoride is prepared by heating iron powder to within 50° of the melting point of ferrous fluoride ($FeFe_2$ melts at about 960° C.) in contact with hydrogen fluoride in a boat within a platinum tube. Boat and contents are maintained at such temperature for a period sufficient to bring about the diffusion-limited reaction. For the quantities actually used, it took two days to reach completion. During this period usual precautions were taken to exclude moisture due again to the hydrolizable nature of ferrous fluoride. The final reacted product appears as an off-white powder which is finally melted at a temperature of 960°–1000° C. in the same boat in an inert atmosphere. The solid mass so produced is removed from the boat.

The ferrous fluoride is broken up, the stoichiometric indicated amount is weighed out, and this is evenly distributed on top of the crystalline rubidium fluoride, still within the boat in which this material was originally prepared by zone refining. Boat and contents still within an inert atmosphere of nitrogen or helium is zone melted, first at a relatively rapid rate of several cm./hr. to form the compound, $RbFeF_3$, and consequently at a sufficiently slow rate to produce the desired crystalline perfection (a rate of about .3 cm./hr. has been found appropriate).

BRIDGMAN

While the materials may be initially prepared by a Bridgman technique, it was found most useful in the further processing of crystals prepared by zone melting as described above. To this end such a zone melted crystal of $RbFeF_3$ was broken and was inserted in a Bridgman crucible made of platinum or graphite. Bridgman crucibles are tapered at their lower extremities, the function of such pointed end being to nucleate single crystal growth. The tapered crucible was sealed in a heavy platinum crucible of approximately the same shape in an inert atmosphere or in a vacuum.

Crucible and contents were melted at about 845° C. and were recrystallized from the tapered end upward at approximately 1 mm. per hour. After crystallization and before removal, the crystal and material were annealed over a schedule which lasted about two days. During this period the crystal was maintained at 700° C. for about 12 hours subsequent to which it was cooled to room temperature at a rate of about 25° per hour.

General properties of $RbFeF_3$ $RbFeF_3$ is a Perovskite and is paramagnetic above about 102° K. Below this temperature the compound becomes tetragonal, and from the magnetic standpoint is either antiferromagnetic or metamagnetic. At about 87° K. there is a crystallographic first order transition. The material is further distorted probably to the orthorhombic state. Magnetically, the material evidences domain magnetism. For convenience it is considered that the material below this Curie point of about 87° K. is ferromagnetic although the possibility exists that it may be ferrimagnetic.

The distortion introduced below the Curie point is fairly small and it is convenient to describe it crystallographically as if it were still cubic. It has been observed that in this ferromagnetic state below 87° K. there is an easy direction which has been identified as corresponding to one of the three <100> directions. Experimental evidence suggests that a particular <100> is selected, that is, in accordance with this invention the easy direction may be either [100] or [010] or [001]. It has been found that the easy direction may be predetermined by cooling the material through its Curie point with an applied field along any one of the <100> directions. Assuming for the sake of convenience that the easy direction so determined is the [100], it is now possible to saturate or to reverse the magnetization along such [100] direction with a field having a flux of the order of 200 gauss or less depending on any shape anisotropy (in a rod of device dimensions the magnetization may be about 100 gauss).

An easy direction may be produced in any other of the <100> directions by applying a field having a flux of the order of 300 gauss, with the material at all times below its Curie point of 87° K. Experimentally, it has been observed that a structural change accompanies the change in easy direction so induced. Further, the same experiments indicate that saturation in the new easy direction is achieved not by domain rotation from the old easy direction but rather by resaturation in the new direction. This experiment suggests a significant anisotropy field.

The crystallographic directions indicated in the discussion in FIG. 3 are based on the above considerations. Whether in the isolator or modulator mode depending on magnetic rotation, it is necessary to produce a component of magnetization in a beam propagation direction. This is most easily accomplished by propagating the beam in the easy <100> direction. For an isolator, the entire field may be so applied. In the magnetic rotation modulator, this component is varied in magnitude by tilting an orthogonally applied field. The magnitude of flux of the orthogonal field is significantly greater than that required to saturate in the easy direction, and it is therefore ordinarily equal to or greater than the value of about 300 gauss which is, at least near the Curie point, sufficient to produce a new easy direction. It is therefore desirable to orient the orthogonal field in a direction such that no 300 gauss component is produced in a <100> direction other than the beam propagation direction. The preferred direction for such D-C field is, accordingly, in a <110> direction. Assuming for the moment that the easy or propagation direction is [100], the orthogonal field may be applied in an [011] direction. Such direction is 90° to [100] and at 45° to each of [010] and [001].

From the physical and chemical standpoint, the material is durable and unaffected by ordinary atmospheric materials. It is sufficiently hard so that it can be expediently cut and polished to produce optically flat surfaces.

From the compositional standpoint, the described properties have been found to be intimately associated with the particular composition $RbFeF_3$. Apparently related materials such, for example, as sodium iron fluoride $Na_5Fe_3F_{14}$ and rubidium nickel fluoride $RbNiF_3$ do not show the described properties. The first material does not have a cubic related symmetry. The second material, which has hexagonal symmetry, has only a narrow transparency window in the visible within which absorption is substantially larger than for $RbFeF_3$ and in which rotation is substantially smaller. Nevertheless small deviations in composition may result in retention of the excellent unique properties of the compound while enhancing the material in other regard. For example, saturation magnetization may be altered by partial substitution for iron of a nonmagnetic divalent ion. Suggested elements showing sufficient transparency for this purpose are divalent cobalt, vanadium, nickel and manganese.

The invention has been described in terms of a limited number of illustrative embodiments. Broadly, it is premised on the coincidence of magnetic rotation of substantial magnitude and a broad transparency bandwidth including the entire visible spectrum and extending into the ultraviolet. The discovery of these properties give rise to certain otherwise obvious device uses. Broadly speaking, such devices uses are as isolators or modulators. A small number of such devices have been depicted and/or described. The described properties are obviously appropriate to a far larger class of devices.

What is claimed is:

1. Magneto-optic devices comprising a single crystal of a domain-magnetic material evidencing transparency for electromagnetic wave energy, means for magnetizing said crystal, and means for introducing and extracting a beam of coherent polarized electromagnetic wave energy, characterized in that the said crystal consists essentially of $RbFeF_3$.

2. Device of claim 1 in which the beam propagation direction through the said crystal approximately corresponds with a <100> crystallographic direction and in which the wavelength of the said electromagnetic wave energy extends up to 7000 A. units.

3. Device of claim 2 in which the said crystal is substantially magnetically saturated in the said <100> direction.

4. Device of claim 2 in which the said crystal is magnetically saturated in a direction different from the said <100> direction.

5. Device of claim 4 in which there is a magnetization component in a <110> direction.

6. Device of claim 5 in which magnetic saturation results in part from imposition of a first magnetic means applied in a <110> direction orthogonal to the said <100> direction and at 45° to each of the <100> axes not corresponding with the said <100> direction.

7. Device of claim 6 in which the said first magnetic means provides for a unidirectional constant magnitude field and in which a second magnetic means is imposed along the said <100> direction such as to result in a magnetic influence sufficient to tilt the magnetization away from the said <110> direction.

References Cited

Wong et al. "Magnetic Properties of $RbFeF_3$," Journal of Applied Physics, vol. 37, No. 3 (Mar. 1, 1966) pp. 975–976.

DAVID SCHONBERG, Primary Examiner

PAUL R. MILLER, Assistant Examiner

U.S. Cl. X.R.

252—62.51; 350—150, 160